G. H. HAYES.
SPRING SHACKLE.
APPLICATION FILED FEB. 8, 1918.

1,277,580.

Patented Sept. 3, 1918.

WITNESSES

INVENTOR
GEORGE H. HAYES
BY
ATTORNEYS

UNITED STATES PATENT OFFICE.

GEORGE H. HAYES, OF MINNEAPOLIS, MINNESOTA.

SPRING-SHACKLE.

1,277,580. Specification of Letters Patent. Patented Sept. 3, 1918.

Application filed February 8, 1918. Serial No. 216,064.

*To all whom it may concern:*

Be it known that I, GEORGE H. HAYES, a citizen of the United States, resident of Minneapolis, county of Hennepin, State of Minnesota, have invented certain new and useful Improvements in Spring-Shackles, of which the following is a specification.

The object of my invention is to provide a spring shackle for use on certain styles or makes of vehicles where the shackle described in my U. S. Patent No. 1,180,036, issued April 18, 1916, could not be successfully used.

The invention consists generally in various constructions and combinations, all as hereinafter described and particularly pointed out in the claims.

Figure 1:
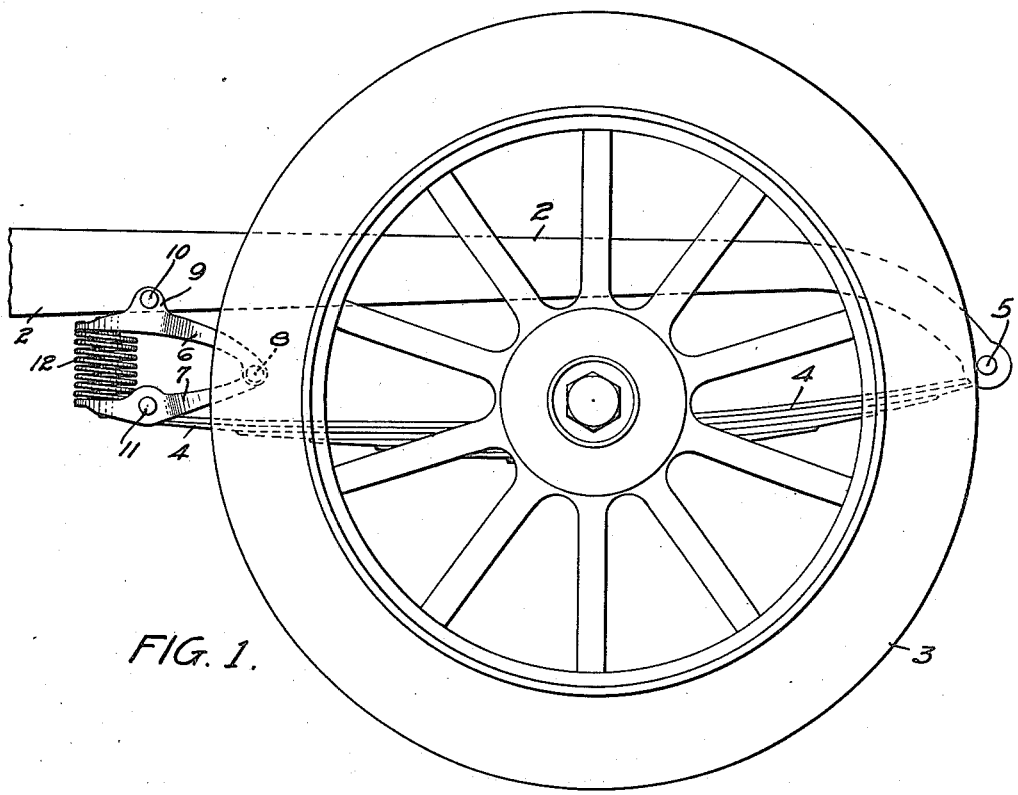
Figure 2:
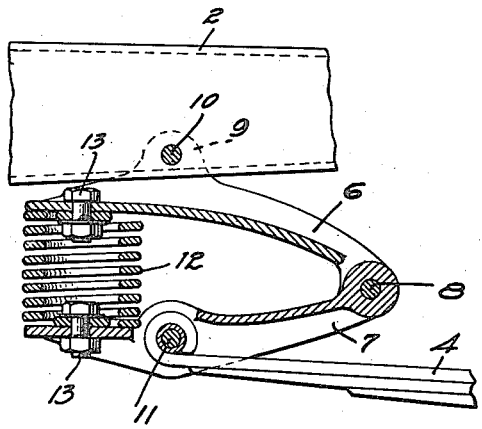
Figure 3:
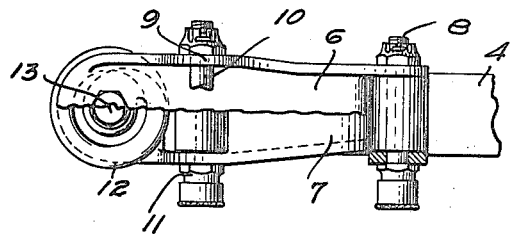

In the accompanying drawings forming part of this specification,

Figure 1 is a side elevation of the forward portion of a vehicle, with my invention applied thereto, Fig. 2 is a detail sectional view of the shackle, showing the manner of mounting it on the chassis of the car and spring, Fig. 3 is a top view of the same, with a portion of the upper section of the shackle broken away.

In the drawing, 2 represents one of the side bars or rails of the chassis, 3 a forward wheel mounted on the car axle in the usual way. 4 is a spring of the half elliptic type, pivotally connected at 5 to the forward end of the bar 2, the middle portion of the spring being secured to the axle in the usual way. At the rear end of the spring I provide a shackle which forms the subject matter of my present invention. This shackle comprises an upper rigid member 6 and a lower rigid member 7, the forward adjacent ends of said members being pivoted together by suitable means, such as a bolt 8 for freedom of oscillation one upon the other. The member 6 has ears 9 formed thereon intermediate to its ends and these ears are pivotally connected by a bolt 10 to the bar 2. The lower member 7 has a bolt 11 mounted therein on which the rear end of the spring 4 is mounted for freedom of oscillation. The space between the members 6 and 7 is unobstructed and within this space, preferably in the rear of the pivots 10 and 11, I provide a comparatively heavy compression spring 12 of the helical type, the ends of the spring being secured respectively to the end portions of the members 6 and 7 by bolts 13. This spring, when the parts are assembled on the car, will be put under a certain degree of compression through the weight of the car thereon and in running the car over rough ground where the wheels will frequently drop into depressions or ruts, the lurch of the car body will cause a further compression of the shackle springs and thereby relieve the occupants of the car from jar or shock and provide for a much easier riding car than usual where no shackle of this kind is provided. There will, of course, be a shackle provided on each side of the car and though I have shown it on the forward spring only it may be connected to the rear springs as well. The rigid members will rock on their pivotal connections with the chassis and the springs and automatically accommodate themselves to the different positions assumed by the wheels and car body in the actual running of the car. The members 6 and 7 are sufficiently rigid to prevent yielding thereof so that the forward thrust or inertia of the car is practically all absorbed by the compression springs aided, of course, by the half elliptic springs of the car.

I claim as my invention:

1. The combination, with a vehicle frame, of a spring having one end attached to said frame and a shackle pivotally connecting the opposite end of said spring with said frame, said shackle comprising a pair of substantially rigid members having their forward ends pivoted one upon the other, one of said members having a pivotal connection intermediate to its ends with said frame, the other member having a pivotal connection intermediate to its ends with said vehicle spring, and a compression spring interposed between said members and yieldingly resisting relative movement thereof.

2. The combination, with a vehicle frame, of a spring having one end attached to said frame and a shackle pivotally connecting the opposite end of said spring with said frame, said shackle comprising a pair of substantially rigid members having their forward ends pivoted one upon the other, one of said members having a pivotal connection intermediate to its ends with said frame, the other member having a pivotal connection intermediate to its ends with said vehicle spring, an unobstructed space being provided between said members and a compression spring interposed between the ends of said members in the rear of their pivotal connections with said frame and with said vehicle spring.

In witness whereof, I have hereunto set my hand this 17" day of January 1918.

GEORGE H. HAYES.